(12) United States Patent
Kistner et al.

(10) Patent No.: US 12,430,660 B2
(45) Date of Patent: Sep. 30, 2025

(54) APP STORE PEER GROUP BENCHMARKING WITH DIFFERENTIAL PRIVACY

(71) Applicant: Apple Inc., Cupertino, CA (US)

(72) Inventors: Nicholas Kistner, Cupertino, CA (US); Andrew T. Maher, Cupertino, CA (US); Artem Kirillov, Cupertino, CA (US); Daniela S. Antonova, York (GB); Mahesh Molakalapalli, Fremont, CA (US); Matthew Tan Teik Hoe, Cupertino, CA (US); Maxim Martynov, Cupertino, CA (US); Rajiv J. Krishnamurthy, Cupertino, CA (US); Vivek Krishnan, Cupertino, CA (US); Yogesh V. Padte, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 17/805,460

(22) Filed: Jun. 5, 2022

(65) Prior Publication Data

US 2023/0394509 A1  Dec. 7, 2023

(51) Int. Cl.
*G06F 21/62* (2013.01)
*G06Q 30/0202* (2023.01)

(52) U.S. Cl.
CPC ................. *G06Q 30/0202* (2013.01)

(58) Field of Classification Search
CPC ..... G06Q 30/0202; G06Q 10/04; G06Q 10/06
USPC ........................................................ 726/26
See application file for complete search history.

(56) References Cited

U.S. PATENT DOCUMENTS

| | | | | |
|---|---|---|---|---|
| 9,983,871 | B1* | 5/2018 | Edwards | G06F 11/302 |
| 10,269,029 | B1* | 4/2019 | Evans | G06Q 30/0201 |
| 11,223,676 | B1* | 1/2022 | Ramachandran | H04L 67/535 |
| 2005/0240467 | A1* | 10/2005 | Eckart | G06Q 40/12 705/30 |
| 2009/0055382 | A1* | 2/2009 | Kerschbaum | G06Q 10/06 707/999.005 |
| 2013/0346161 | A1* | 12/2013 | Mayerle | G06Q 10/0639 705/7.39 |
| 2017/0243150 | A1* | 8/2017 | Dave | G06Q 30/0254 |
| 2018/0322525 | A1* | 11/2018 | Ungerer | H04W 12/033 |
| 2019/0391904 | A1* | 12/2019 | Sabharwal | G06N 3/08 |
| 2020/0267209 | A1* | 8/2020 | Lyons | G06F 18/24147 |
| 2020/0358594 | A1* | 11/2020 | Becher | H04L 9/008 |
| 2021/0019247 | A1* | 1/2021 | Hurley | G06F 11/324 |

(Continued)

*Primary Examiner* — Taghi T Arani
*Assistant Examiner* — Pegah Barzegar
(74) *Attorney, Agent, or Firm* — Blank Rome LLP

(57) ABSTRACT

Providing peer group benchmarking with differential privacy obtaining one or more app store metrics for a first application, determining an application peer group for the first application, wherein the application peer group is determined based on a plurality of common traits, and obtaining one or more peer group app store metrics for the application peer group based on the one or more app store metrics. A user interface is displayed to indicate a relative placement of at least one of the one or more app store metrics for the first application among the peer group app store metrics, and the user interface element identifies the application peer group metrics with a minimum level of accuracy without revealing the performance of individual apps within the peer group.

20 Claims, 7 Drawing Sheets

(56) References Cited

U.S. PATENT DOCUMENTS

| | | | |
|---|---|---|---|
| 2021/0073658 A1 | 3/2021 | Poole | |
| 2021/0109835 A1* | 4/2021 | Raghavan | G06F 11/3438 |
| 2021/0344489 A1* | 11/2021 | Becher | H04L 9/085 |
| 2022/0050814 A1* | 2/2022 | Alt | G06N 3/08 |
| 2022/0114525 A1* | 4/2022 | Malpani | G06Q 10/06 |
| 2022/0327634 A1* | 10/2022 | Neelakandan | G06F 16/29 |
| 2023/0126313 A1* | 4/2023 | Shah | H04W 24/02 |
| | | | 370/252 |
| 2023/0176843 A1* | 6/2023 | Huang | G06Q 30/0201 |
| | | | 717/175 |
| 2023/0394509 A1* | 12/2023 | Kistner | G06Q 10/06 |

\* cited by examiner

APP STORE PEER GROUP BENCHMARKING WITH DIFFERENTIAL PRIVACY

TECHNICAL FIELD

Embodiments described herein relate to a platform for providing software applications. More particularly, embodiments described herein relate to providing peer group benchmarking of software applications.

BACKGROUND

In recent years, downloading of software applications (or "apps") from an on-line distribution platform, such as an app store, has become a popular method for obtaining software applications. An on-line app store allows users to download a software application onto their device, such as a desktop computer or laptop computer, smartphone, or other mobile device, and then install the app on their device. Prior to downloading an app, users often find apps within the app store.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

This disclosure pertains to systems, methods, and computer readable media for providing peer group benchmarking analysis to developers who publish apps on an app store platform. In some embodiments, the peer group benchmarking techniques introduce a level of privacy for members of the peer group such that the peer group benchmarking data is useful to an app developer or other user, while preventing the developer from learning sensitive information of other members of the peer group.

Developers can provide applications for download on a digital distribution platform, such as an app store. In some embodiments, developers can track performance of apps provided on an app store using an analytics interface. For example, developers can view app metrics related to monetization, usage, crash, conversion, and other metrics. However, viewing app metrics alone may have limited value to a developer because without context regarding how similar apps perform with respect to those metrics, the developer may not have enough knowledge to effectively gauge performance. As such, in some embodiments, peer group benchmarking is provided such that the app metrics are compared to app metrics for similar apps provided in the digital distribution platform. Accordingly, the analytics interface may provide a comparative analysis of a particular app's performance relative to other apps in the same peer group, enabling app developers to make more informed assessments.

One potential drawback of providing peer group benchmarks is that it can be difficult to avoid exposing information to the developer related to individual apps or individual developers. As the analytics information becomes more tailored to a specific peer group, lower levels of privacy are typically provided to members of the peer group. Another drawback of providing peer group benchmarks is that it can be difficult to provide accurate and useful peer group data if too much privacy is maintained for members of the peer group. As such, embodiments described herein provide a technique for ensuring a sufficient level of accuracy, while still providing privacy to members of the peer group.

Figure 1:
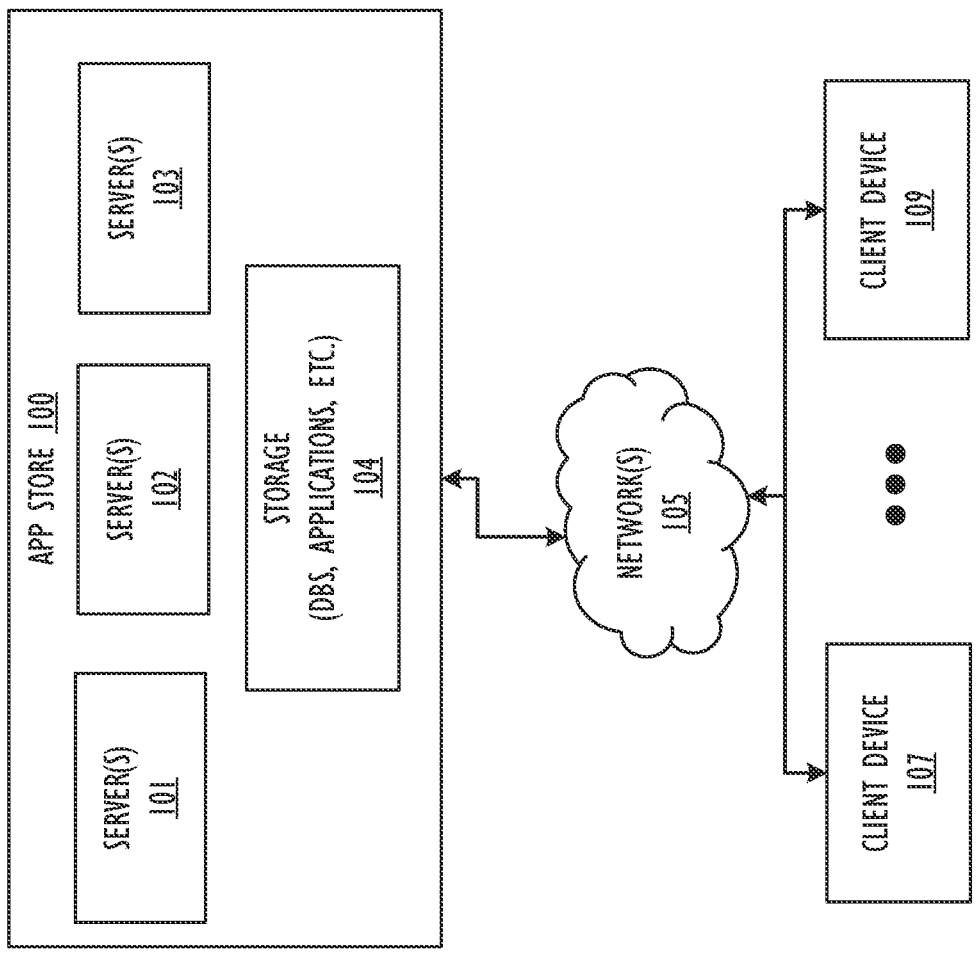
FIG. 1 illustrates, in block diagram form, network by which an app store is accessed by client devices, according to one or more embodiments.

FIG. 1 illustrates, in block diagram form, a network by which an app store is accessed by client devices, according to one or more embodiments. The network diagram includes a digital distribution platform (referred to herein as an app store) 100, communicably connected to client devices 107 and 109 across one or more network(s) 105.

The embodiments described herein can operate within and interface with the environment and context of an app store from which one or more users, using client devices, can search for and download one or more applications (also referred to as apps). An app store 100 can include one or more servers, such as servers 101, 102, and 103, that can provide the functionality described herein. For example, server(s) 101 can interface with a client device to implement the methods of FIGS. 2 and 3 to generate app interaction data, such as from client devices 107 and 109 which can take a variety of different forms (e.g., tablet computer such as an iPad, smartphone such as an iPhone, laptop computer, desktop computer, network media player such as an Apple TV, game/entertainment system, or other consumer electronic device). The client devices 107 and 109 can be coupled to the app store 100 by one or more networks 105, such as the Internet, which provides for the data communication between the client devices and the app store so that the client devices can send app interaction data to the app store, such as search queries, requests to download, subsequent app open events, requests to make purchases, and the like. The server(s) 101, in one embodiment, can create the data structures used in producing app metrics, and store those data structures in storage 104 for later use by server(s) 102 which can be configured to produce peer group benchmarking metrics.

An app store, such as the app store shown in FIG. 1 can collect and report information about the performance of the apps hosted on the app store. For example, the app store can include an analytic interface which provides to a developer metrics related to monetization, usage, crash rate, conversion, and other metrics. In some embodiments, the app store 100 can determine app metrics for groups of applications. For example, a set of peer applications may be identified based on shared traits, and one or more combined app metrics are determined for the peer group benchmark.

According to some embodiments, metrics may be based on performance of the apps hosted by the app store 100. This information can be collected in logs maintained by the app store. In one embodiment, the one or more servers 102 can maintain a record during a user's interactions with an app, and this record can be recorded in one or more logs.

The servers (101, 102, 103) and/or the client devices 107 and 109 can also include memory for storing, managing, and/or retrieving apps from the app store 100 including analytics data. According to some embodiments, the client devices 107 and 109 may provide access to the app store 100, on which multiple applications may be hosted. Memory may include one or more different types of media used by a processor of the device, in order to perform device functions. For example, memory may include memory cache, read-only memory (ROM), and/or random access memory (RAM). Storage 104 may store media (e.g., audio, image and video files), computer program instructions or software, preference information, device profile information, and any other suitable data. Storage 104 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory and storage may be used to retain computer program instructions or code organized into one or more modules and written in any desired computer programming language. When executed by, for example, processor, such computer program code may implement one or more of the methods described herein.

Figure 2:
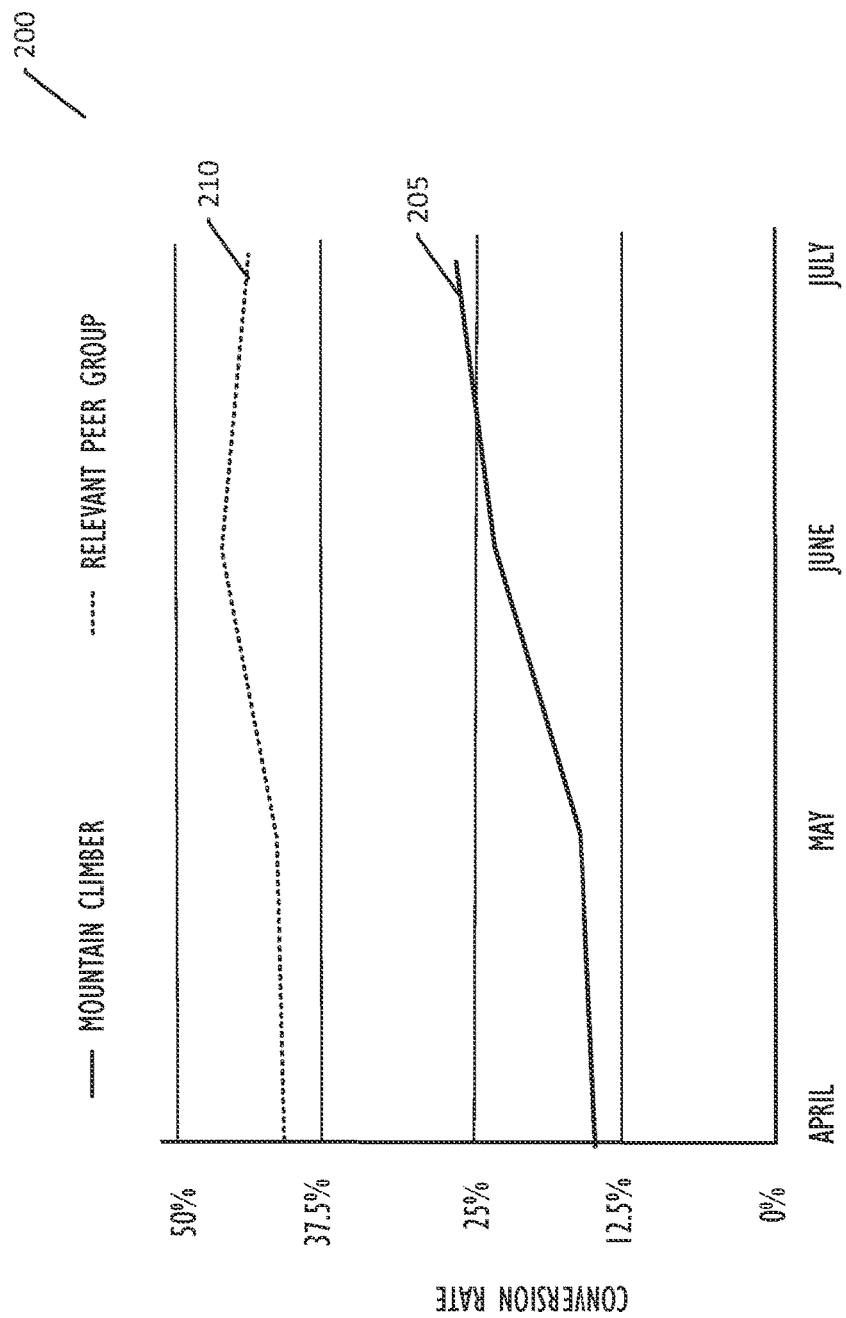
FIG. 2 illustrates an example diagram of comparative analytics between an app and a peer group to which the app belongs, in accordance with one or more embodiments.

According to some embodiments, providing analytic data to a developer is improved when providing context for the particular app being considered. For example, the performance of a particular app may appear to be improving, but when considering similar apps, may not be performing as well as expected. Thus, FIG. 2 illustrates an example diagram of comparative analytics between an app and a peer group to which the app belongs, in accordance with one or more embodiments. The chart 200 shows a conversion rate, such as a download rate based on exposure of the app to users, over a time period from April to July. The chart 200 shows the conversion rate for an app called Mountain Climber at 205. As shown, the conversion rate of Mountain Climber consistently increases from around 14% in April to 26% in July, with a steep rise between May and June. Accordingly, without context, a developer for Mountain Climber may determine, without context, that the Mountain Climber app is performing well with respect to conversion rate.

However, when considering similar apps, the performance of the Mountain Climber app may appear differently. Thus, in some embodiments, peer group benchmarking analytics are provided. The relevant peer group may be based on common traits between the Mountain Climber app and other apps in the app store. For example, in some embodiments, the common traits may be selected among a category set for the application. The categories for the category set may include, for example, an application type, a monetization type, a download volume, and the like. In some embodiments, the technique used to select the peer group may determine that the resulting peer group app store metrics do not divulge sensitive information for any peer group members. As such, in some embodiments, the peer group may be selected so as to include a threshold number of applications, a threshold number of developers associated with the member applications, and the like. In addition to a threshold level of privacy, the peer group metrics may also be required to meet a threshold level of accuracy before they are displayed so that a developer for Mountain Climber can still use the peer group data to make informed business decisions.

As shown at 210, the conversion rate for the relevant peer group is higher, but flatter, than the conversion rate for the Mountain Climber app, as shown at 205. That is, the conversion rate of the relevant peer group increases from around 39% in April to 45% in June, before dropping to 40% in July. Accordingly, when viewed in comparison with the Mountain Climber conversion rate 205, the Mountain Climber app has an overall worse conversion rate. However, on a positive note, whereas the conversion rate for the relevant peer group dropped from June to July, the conversion rate for the Mountain Climber app continued to rise. As such, the developer of the Mountain Climber app can quickly determine performance among the relevant peer group. Notably, the relevant peer group does not disclose any member of the group, nor does the interface indicate how the peer group was selected, although at least some information regarding the relevant peer group may be provided in alternative embodiments. This is because, in this example, a privacy algorithm has been applied to satisfy a privacy threshold, resulting in a view of the comparative performance of the Mountain Climber app to the relevant peer group without divulging identifying or other specific app metrics of any peer group member. Additionally, even though the privacy algorithm introduced small levels of inaccuracy to the relevant peer group metrics to preserve privacy, the metrics are still accurate enough to satisfy an accuracy threshold because the amount of privacy introduced does not materially impact the developer's ability make informed business decisions based on the data.

Figure 3:
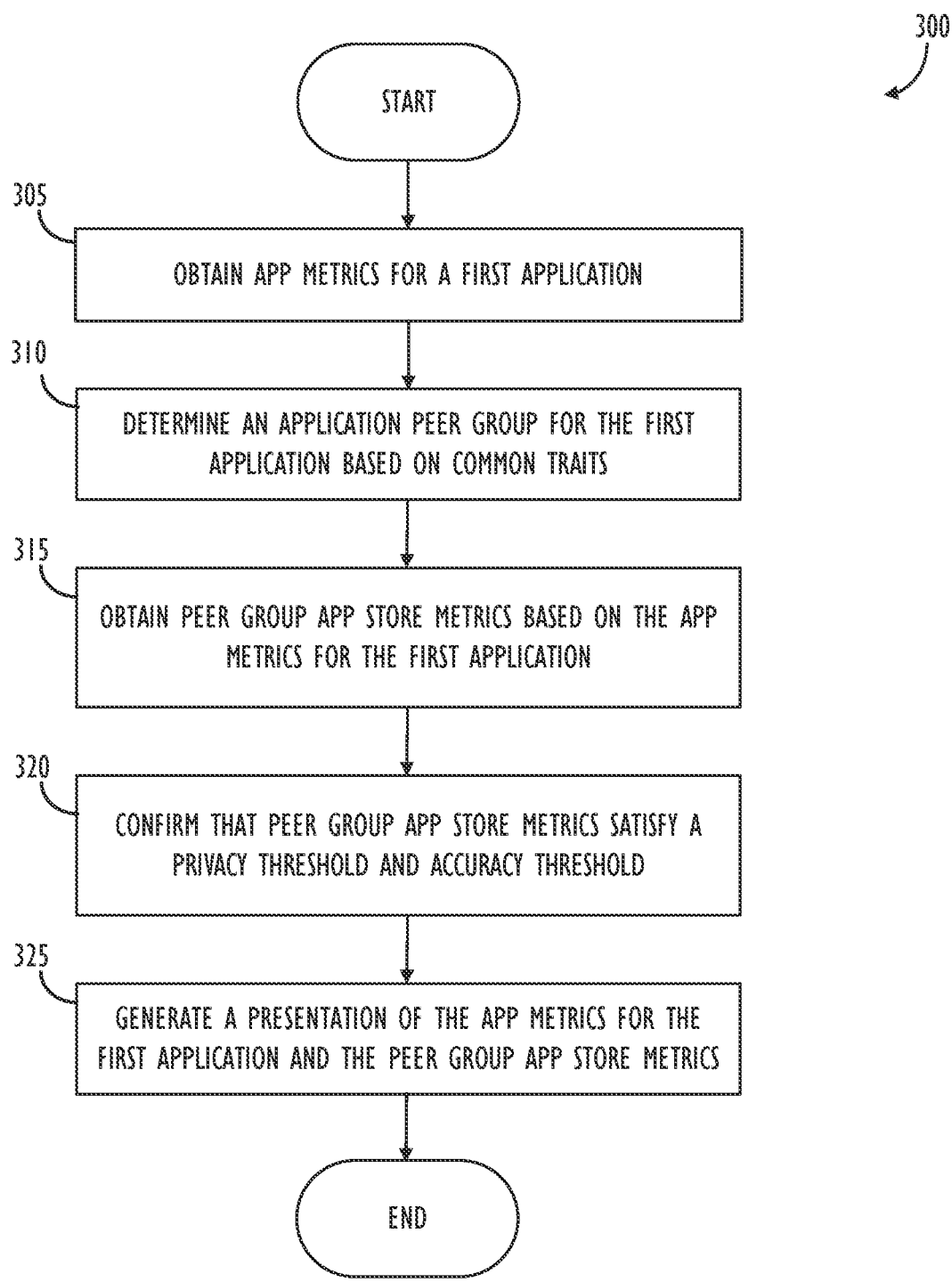
FIG. 3 illustrates, in flowchart form, a technique for providing app analytics with peer group benchmarking, in accordance with one or more embodiments.

FIG. 3 illustrates, in flowchart form, a technique for providing app analytics with peer group benchmarking, in accordance with one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

The flowchart 300 begins at block 305 and app metrics are obtained for a first application. For example, in some embodiments a developer or other stakeholder in an app may access an analytics interface from which the developer may review performance of an app. A distribution platform or other system may provide the app performance metrics for the application through the analysis interface. Thus, at block 305, the system may obtain app metrics for the application. The app metrics may be one or more metrics related to the performance of the app. Performance may be related to the usability or workability of the application, and or economic or download performance. That is, performance may refer to how well the app works, as well as how frequently the app is downloaded from the digital distribution platform. The app metrics may include, for example, discoverability metric, a usage metric, a monetization metric, a crash rate, a conversion rate, and other metrics. Thus, in some embodiments, the system, such as app store 100 may track data related to access and download from within the app store, as well as performance of the app once it is downloaded by an end user.

The flowchart 300 continues at block 310 where an application peer group is determined for the first application based on common traits in the first application and other applications available on the same digital distribution platform. In some embodiments, the peer group may include applications similar to the first application such that the app metrics for the app may be compared to those of relevant peers. The common traits may be based on categories assigned to the apps, for example, an application type, a monetization type, a download volume, and the like. The application type may include, for example, entertainment, photo and video, kids, shopping, health and fitness, productivity, and the like. The application type may be pertinent because apps of different types are interacted with in different ways. As an example, a travel app may be used frequently while a user is traveling, but otherwise, not at all, whereas a photo app may be used consistently over a long period of time. Monetization type may be a category of app related to how the app is monetized on the digital distribution platform. For example, a business model may indicate the monetization type for the app. As an example, the monetization type may be free apps, freemium, paid apps, paidmium, subscription-based app, and the like. According to some embodiments, apps with different business models may be linked to different user behavior, thereby influencing performance metrics. The download volume may describe a volume of downloads for the app as compared to other apps. For example, a low download tier may describe an app for which a low download rate is associated, either compared to similar apps and/or compared to other apps in the app store. By contrast, a high download tier may describe an app for which a high download rate is associated, either compared to similar apps and/or compared to other apps in the app store.

In some embodiments, the peer group apps may be selected based on the particular app for which a request for a peer group benchmark is received. In some embodiments, the peer group apps may be selected based on an app for which analytics are provided and/or based on one or more particular metrics. That is, a peer group may be selected based on a type of metric being analyzed, or for which analytics information is presented. For example, if an app can see a peer group with highly granular attributes for one metric, but needs to see a peer group with reduced granularity for another metric in order to meet the privacy threshold, then the application will be included in the more granular group for one metric and the less granular group for the other metric.

At block 315, the flowchart 300 includes obtaining peer group app store metrics based on the app metrics that are being considered for the first application. That is, peer group app store metrics may be provided for peer group benchmarking obtained for the app metrics obtained at 305. For example, a set of corresponding metrics may be obtained for a relevant peer group. The peer group metrics may include, for each of the metrics provided related to the first app, a metric corresponding to the combined peer group.

The flowchart 300 continues at block 320 where the system confirms that the peer group app store metrics satisfy a privacy threshold. As described above, in some embodiments, the peer group benchmarking analytics are provided in a manner such that the privacy of peer group members is maintained. For example, in some embodiments, the identify of individual members and/or app metrics of individual peer group members is obfuscated. Moreover, in some embodiments in which multiple apps are associated with a common developer, owner, or other stakeholder, privacy is considered such that a user having access to a certain set of application metrics can't identify peer group members and/or infer peer group member metrics by leveraging the knowledge of app metrics across multiple applications in the peer group.

In some embodiments, the privacy threshold may be satisfied using a differential privacy technique. Thus, a privacy algorithm may be applied to ensure that patterns of the peer group are provided while withholding information about the individual members of the peer group. The privacy threshold may be based on one or more rules, such as determining that individual members or metrics are not identifiable to any member. In some embodiments, the privacy threshold may additionally, or alternatively, ensure that specific metrics for the group are not disclosed to any user. For example, in some embodiments, a margin of error may be introduced into one or more of the peer group app store metrics in order to maintain useful data regarding patterns within the data and compared to the first application app store metric, while not disclosing the real app store metrics for the peer group. According to some embodiments, the privacy threshold may be satisfied by applying the privacy algorithm to the peer group data. In some embodiments, an accuracy threshold may also be applied to ensure that the privatized peer group app store metrics are still useful. The accuracy threshold may indicate that a maximum margin of error applied by the privacy algorithm does not exceed that sufficient level of accuracy. For example, the accuracy threshold may be based on a level of accuracy at which the resulting privatized peer group app store metrics are provided. Satisfying the accuracy threshold may indicate that the privatized data is sufficiently accurate to enable the user to make informed business decisions.

The flowchart 300 concludes at 325 where a presentation of the app metrics is generated for the first application and the peer group app store metrics. As described above, in some embodiments, an analytics interface may be provided in which the app store metrics are presented. These app store metrics and the per group app store metrics may be presented in a manner such that a user is able to compare performance of a particular app to the performance of the relevant peer group apps on the same digital distribution platform. The analytics interface may include one or more presentations styles as will be described below to enhance presentation of performance analytics compared against a peer group while providing privacy for the peer group and usefulness to the developer.

Figure 4:
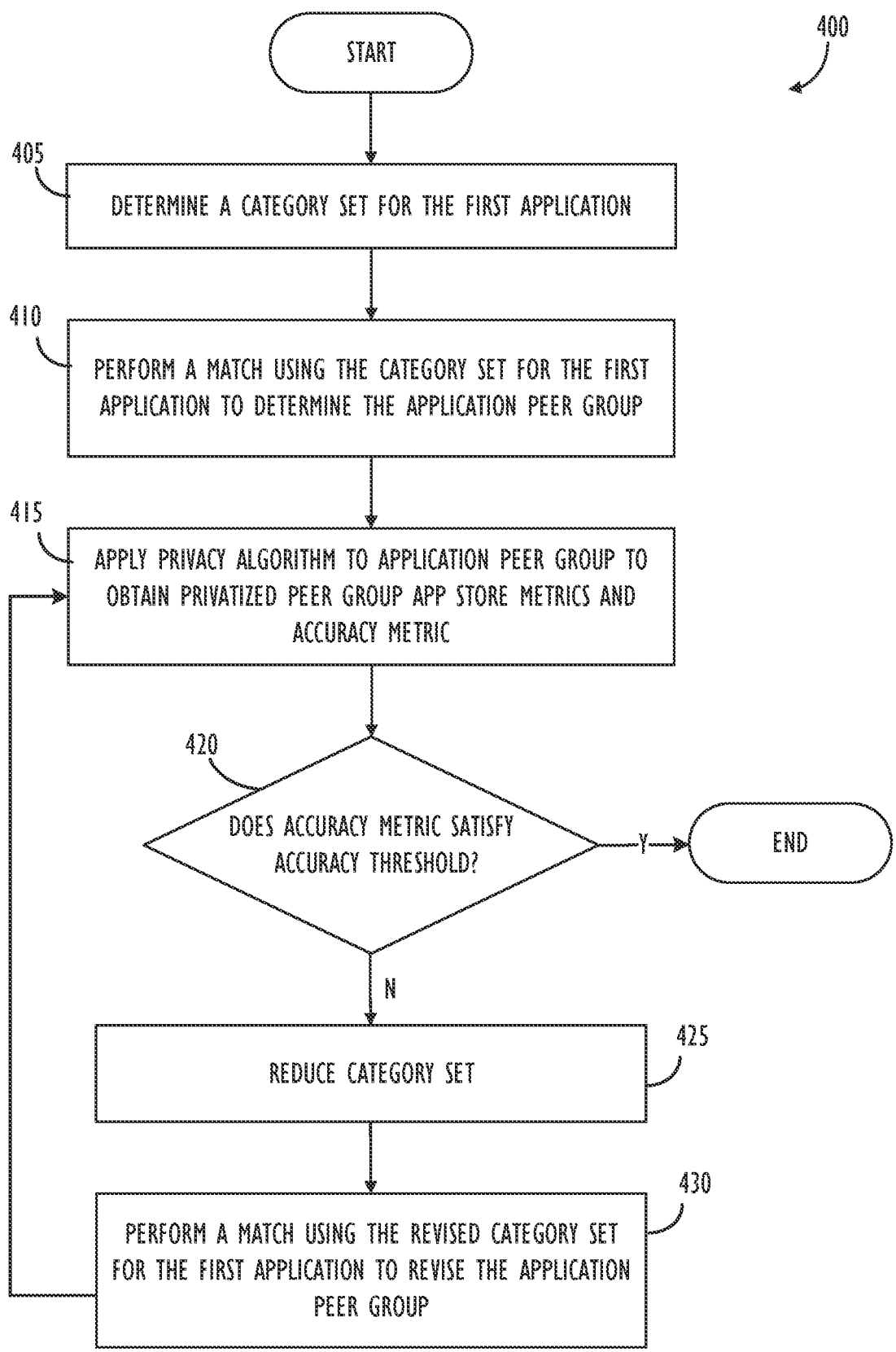
FIG. 4 illustrates, in flowchart form, a technique for selecting a peer group for an app, in accordance with one or more embodiments.

In some embodiments, ensuring that a privacy threshold is satisfied involves modifying selection of a peer group for an app. In particular, in some embodiments, the peer group may be refined to ensure that a privacy threshold and/or an accuracy threshold is satisfied. FIG. 4 illustrates, in flowchart form, a technique for selecting a peer group for an app, in accordance with one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

The flowchart 400 begins at block 405 where a category set is determined for the first application. The category set may include, for example, an application type, a monetization type, a download volume, and the like. In some embodiments, the category set may include traits for the currently analyzed application which can be used to identify peer applications hosted on digital distribution platform. In some embodiments, the particular categories used for the determined category set may be predefined, or may be based on a particular application or metric analyzed for the application, or some combination thereof. In some embodiments, the category set may be predefined, or otherwise already known for the first application. At block 410, a match is performed using the category set for the first application to determine the application peer group. In some embodiments, performing the match may include identifying at least some additional applications hosted on the digital distribution platform having the same (or equivalent) categorical values as the first application for the first category set. Thus, a subset of the hosted applications may be considered as relevant peer applications.

At block 415, a privacy algorithm is applied to the application peer group to determine one or more privatized app store metric values, and an accuracy metric. According to some embodiments, the privacy algorithm may be configured to provide the privatized app store metric values, along with an indication of a level of accuracy for the privatized the app store metric values for the peer group. That is, the privacy algorithm inserts an amount of uncertainty or inaccuracy to the app store metric values in order to maintain privacy for the peer group members. In some embodiments, the privacy algorithm may consider a number of members of the peer group. For example, whether the application peer group includes a threshold number of members. In some embodiments, the threshold number of member may be a number of members at which privacy of the individual members may satisfy a privacy threshold. In some embodiments, whether the application peer group includes a threshold number of members may be based on a number of apps, a number of developers, a number of app owners or other stakeholders, or a combination thereof. In other embodiments, additional or alternative considerations may be used by the privacy algorithm to process and provide the peer group app store members in order to satisfy a privacy threshold.

The flowchart 400 continues to block 420 where a determination is made regarding whether the accuracy metric provided by the privacy algorithm satisfies an accuracy threshold. The accuracy threshold may indicate that a margin of error applied by the privacy algorithm still enables a sufficient level accuracy. For example, the accuracy threshold may be based on a level of accuracy at which the resulting privatized peer group app store metrics are provided. Satisfying the accuracy threshold may indicate that the privatized data is sufficiently accurate to enable the user to review the provided app store metrics and make informed business decisions. If the application peer group satisfies the accuracy threshold, then the flowchart ends, and the application peer group is used for providing peer group benchmarking for an application.

Returning to block 420, if a determination is made that a current application peer group does not satisfy an accuracy threshold, then the flowchart continues at block 425. At block 425, the technique includes reducing the category set by which peer applications are selected. In some embodiments, one or more of the categories considered at block 410 may be discarded so as to increase a size of the application peer group. For example, if freemium games with low download volume result in a set of privatized peer group metrics that does not satisfy an accuracy threshold, then one or more of the categories may be discarded. As an example, freemium games of any download volume may be considered, thereby increasing the number of peer applications, reducing the amount of privacy needed to not reveal the performance of individual apps, and increasing the accuracy of the privatized values to satisfy the accuracy threshold.

Additionally, or alternatively, a category may be revised to as to increase a size of the peer group. For example, if the initial set of categories used includes an app type of strategy multiplayer games, and the peer group does not satisfy a privacy threshold, then the app type may be abstracted a level or otherwise generalized so as to capture more apps. For example, the strategy multiplayer games may be replaced with a strategy games category such that multiplayer and single player games are both captured. In some embodiments, an ordering of the categories which are reduced or revised may be based on a variety of factors. For example, based on one or more metrics tracked or analyzed for an app, certain categories may be more or less pertinent to defining peer applications. As such, certain categories may be of lower prioritized for defining peer groups, and therefore may be first to be removed or revised.

The flowchart 400 continues at block 430 where a match is performed using the revised category set for the first application to revise the application peer group. That is, a revised set of applications hosted on the digital distribution platform having the same (or equivalent) categorical values as the first application for the revised category set are identified. Thus, a revised subset of the hosted applications may be considered as relevant peer applications. The flowchart 400 returns to block 415 and the privacy algorithm is applied to the revised category set to obtain a new set of privatized peer group metrics and a new accuracy metric.

The flowchart returns to block 420 where another determination is made as to whether the revised application peer group satisfies an accuracy threshold. If the revised application peer group still does not satisfy an accuracy threshold, then the flowchart 400 proceeds to yet again revise the application peer group until the application peer group can satisfy the accuracy threshold after the privacy algorithm is applied.

In some embodiments, various techniques described in FIGS. 3-4 can be performed in various permutations. For example, in some embodiments, some or all of the process described in FIG. 4 related to generating a peer group may be used with respect to block 310 of FIG. 3. Similarly, other features may be provided in various components. Moreover, it should be understood that in some embodiments, not all processes described in the figures may be necessary. As an example, embodiments described herein may not include performing a match using a category set, as described at 410.

Figure 5:
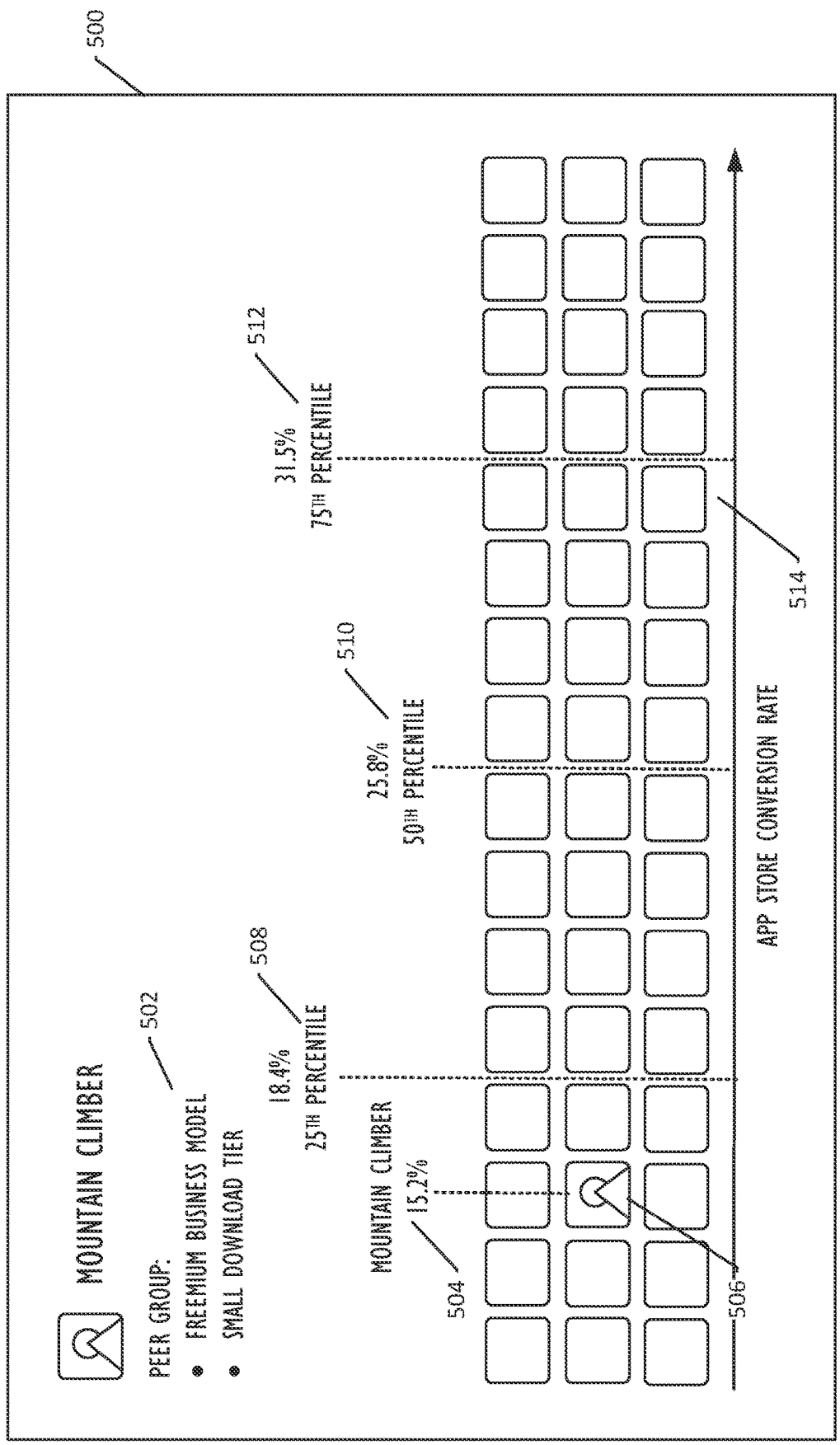
FIG. 5 illustrates an example analytics interface, in accordance with one or more embodiments.

FIG. 5 illustrates an example analytics interface, in accordance with one or more embodiments. According to one or more embodiments, the app store 100 may provide an interface by which a developer and/or other stakeholder can view analytics information for an application. In particular, the developer and/or stakeholder may be provided with an analytics interface 500 in which a particular app (here, Mountain Climber) is compared to peer apps for one or more analytics metrics.

Here, the Mountain Climber app is analyzed for comparative app store conversion rate. In some embodiments, the interface 500 may include some indication of how the peer group is defined, but the indication may be incomplete so as to preserve privacy. As such, at 502, the analytics interface 500 provides an indication that the peer group for the Mountain Climber app for purposes of comparing the app store conversion rate includes apps associated with a Freemium business model, and are part of a low download tier (i.e., a low volume download rate). However, in some embodiments, the actual categories used to determine the peer group may differ from the parameters shown in the analytics interface to preserve privacy.

In some embodiments, the analytics interface 500 may include a graphical representation of the set of peer group apps, as shown by grid 514. Notably, in some embodiments, the grid may include an abstract representation of the peer group apps, and may not identify any individual peer group members or otherwise provide identifying information for the peer group members. As shown, a graphical indication of the current app (e.g., the Mountain Climber app) is shown at 506. Thus, the placement of the graphical indication for the current app among the graphical representation of the peer group provides a visual indication of the relative performance of the app among the peer group for the tracked metric (i.e., app store conversion rate). In addition, in some embodiments, the graphical indication of the application among the graphical representation of the peer group may be presented along with analytics data for the app. As shown at 504, the analytics data for the Mountain Climber app shows that the Mountain Climber app has a 15.2% conversion rate.

In some embodiments, the analytics interface 500 may include additional presentation information which provides further context for the tracked metric. For example, in some embodiments, the analytics interface may provide one or more graphical markings among the graphical representation of the peer group to indicate distribution information for the tracked metric. Accordingly, at 508, a graphical indication of the $25^{th}$ percentile of the peer group apps, showing that the app store conversion rate at the $25^{th}$ percentile is 18.4%. Notably, in some instances, the value provided in the analytics interface 500 may be intentionally uncertain, for example to protect privacy of peer group members. For example, a margin of error may be introduced such that the user of the interface has some context as to how the current app performs among peers without divulging specific data related to the performance of the peer group members. Similarly, at 510, a graphical indication of the $50^{th}$ percentile of the peer group apps, showing that the app store conversion rate at the $50^{th}$ percentile is 25.8%, and at 512, a graphical indication of the $75^{th}$ percentile of the peer group apps, showing that the app store conversion rate at the $75^{th}$ percentile is 31.5%. Accordingly, the analytics interface 500 provides a simplified view of peer group benchmarking in a manner that is useful for a user while protecting the privacy of peer group members.

Figure 6:
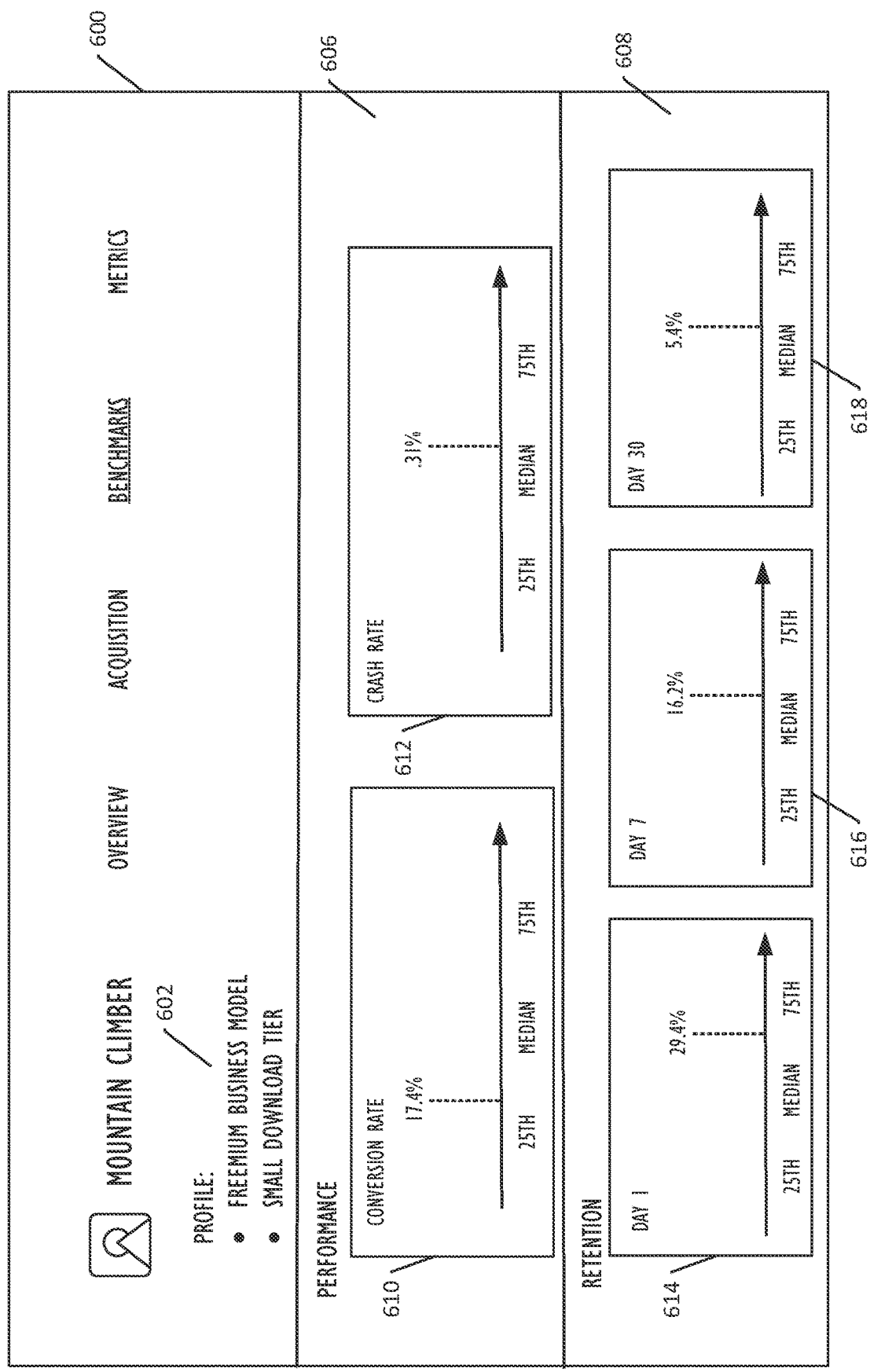
FIG. 6 illustrates an alternative example analytics interface, in accordance with one or more embodiment.

FIG. 6 illustrates an alternative example analytics interface, in accordance with one or more embodiment. The analytics interface 600 provides a view of multiple analytics metrics for an application. In this example, various performance metrics are provided for the Mountain Climber app. Similar to FIG. 5, the analytics interface 500 provides an indication that the peer group for the Mountain Climber app for purposes of comparing the app store conversion rate includes apps associated with a Freemium business model, and are part of a 1 download tier (i.e., a low volume download rate). However, in some embodiments, the actual categories used to determine the peer group may differ from the parameters shown in the analytics interface to preserve privacy.

For purposes of this example, the analytics interface 600 includes a performance display panel 606 in which peer group benchmarking data is provided related to the performance of the application. For purposes of this example, performance includes data related to a rate of engagement and/or download from the app store, as well as performance of the app once it is downloaded on the user device. Accordingly, the performance panel 606 includes a conversion rate portion 610 and a crash rate portion 612. However, it should be understood that the interface may include any number of performance portions.

In some embodiments, the app metrics are presented with a graphical indication of the performance of the app as it is compared to the peer group members. For example, as shown in conversion rate panel 610, the conversion rate of the Mountain Climber app is 17.4%, which falls closer to the $25^{th}$ percentile among peer apps. By contrast, the crash rate portion 612 shows that the crash rate of the Mountain Climber app is 0.31%, which is around the median of peer apps.

Further, in some embodiments, the analytics interface 600 may include additional panels of other categories of analytics data, such as the retention portion 608. The example retention portion 608 includes a set of graphs indicating a set of retention metrics for the Mountain Climber app at different time frames as compared to the peer group apps in the form of a set of time-based metric components. Thus, a first time-based metric component 614 is presented which corresponds to a retention rate for the Mountain Climber app after a first day. As shown, the retention rate on Day 1 is 29.4%. Notably, the first time-based metric component 614 additionally shows a graphical indication of the performance of the Mountain Climber app in relation to the peer group apps with regard to retention on day 1. Specifically, the first time-based metric component 614 indicates that the Mountain Climber app's retention rate on Day 1 is greater than the median retention rate among peer apps hosted by the digital distribution platform.

Similarly, the example retention portion 608 includes a second time-based metric component 616 which corresponds to a retention rate for the Mountain Climber app after a week. As shown, the retention rate on day 7 is 16.2%. Notably, the second time-based metric component 616 additionally shows a graphical indication of the performance of the Mountain Climber app in relation to the peer group apps with regard to retention on day 7. Specifically, the second time-based metric component 616 indicates that the Mountain Climber app's retention rate on Day 7 is similar to the median retention rate among peer apps hosted by the digital distribution platform. Further, the example retention portion 608 includes a third time-based metric component 618 which corresponds to a retention rate for the Mountain Climber app after 30 days. As shown, the retention rate on day 30 is 5.4%. Notably, the third time-based metric component 618 additionally shows a graphical indication of the performance of the Mountain Climber app in relation to the peer group apps with regard to retention on day 30. Specifically, the third time-based metric component 618 indicates that the Mountain Climber app's retention rate on Day 30 remains similar to the median retention rate among peer apps hosted by the digital distribution platform. As such, the retention panel 608 provides a succinct presentation of analytics data benchmarked against peer apps, while preserving privacy of the peer apps.

Figure 7:
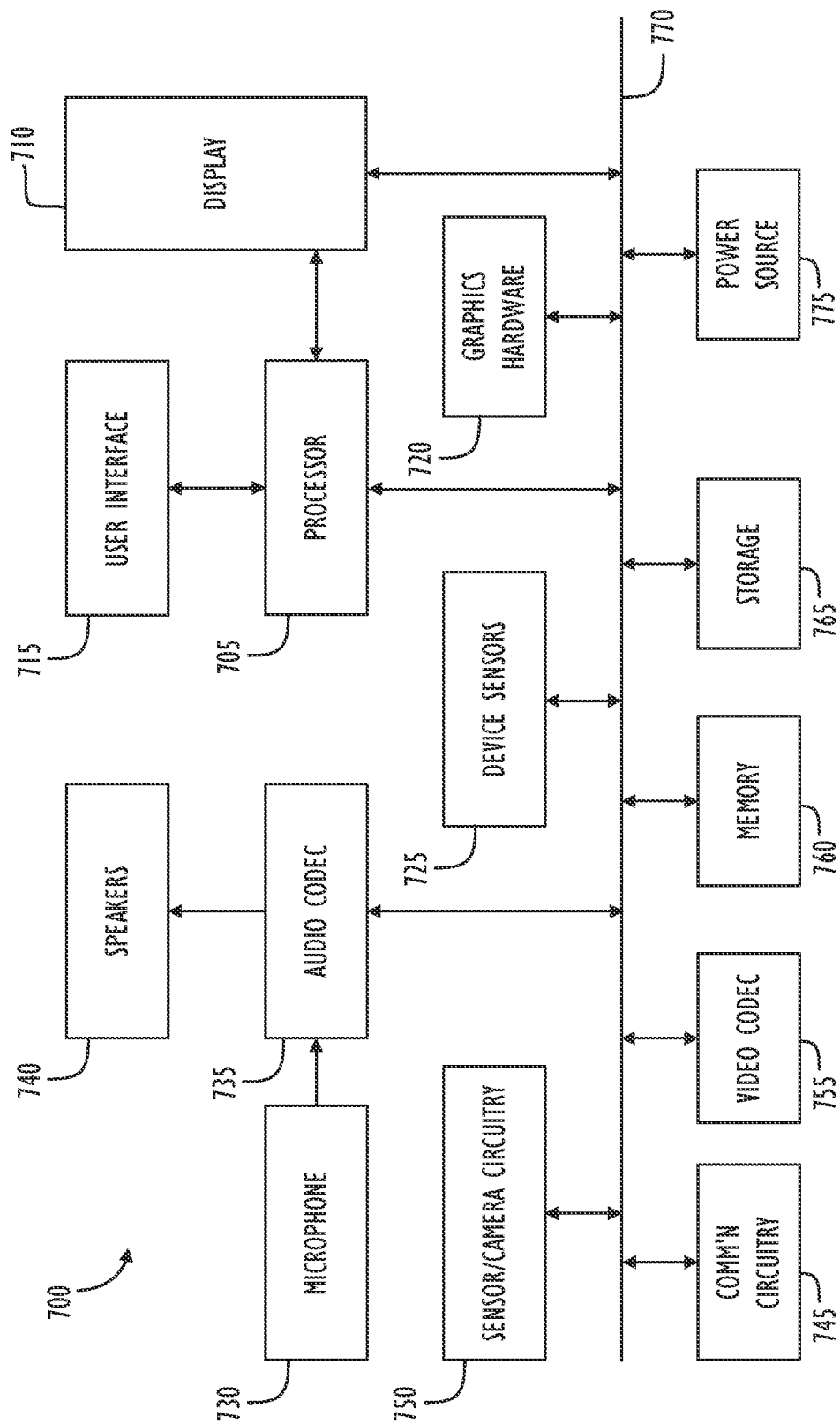
FIG. 7 illustrates a simplified functional block diagram of an illustrative programmable electronic device, in accordance with an embodiment.

Referring now to FIG. 7, a simplified functional block diagram of an illustrative programmable electronic device 700 for providing access to an app store is shown, according to one embodiment. Electronic device 700 could be, for example, a mobile telephone, personal media device, portable camera, or a tablet, notebook or desktop computer system, network device, wearable device, or the like. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, which may, e.g., comprise multiple camera units/optical sensors having different characteristics (as well as camera units that are housed outside of, but in electronic communication with, device 700), video codec(s) 755, memory 760, storage 765, and communications bus 770.

Processor 705 may execute instructions necessary to carry out or control the operation of many functions performed by device 700 (e.g., such as the generation and/or processing of app store metrics accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 710 may display a video stream as it is captured while processor 705 and/or graphics hardware 720 and/or image capture circuitry contemporaneously store the video stream (or individual image frames from the video stream) in memory 760 and/or storage 765. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may comprise one or more camera units configured to capture images, e.g., in accordance with this disclosure. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

In the foregoing description, numerous specific details are set forth, such as specific configurations, properties, and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense, rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

As described above, one aspect of the present technology is the gathering and use of data available from various sources to improve the delivery to developers insightful analytics about their apps. The present disclosure contemplates that in some instances, this gathered data may include personal information data that uniquely identifies or can be used to contact or locate a specific person. Such personal information data can include demographic data, location-based data, telephone numbers, email addresses, social networking handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine certain app store metrics. Accordingly, use of such personal information data enables users to have more streamlined and meaningful experience with the app store and apps hosted by the app store. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized app information pages, the present technology can be configured to allow users to select to "opt in" or "opt out" of participation in the collection of personal information data during registration for services or anytime thereafter. In another example, users can select not to provide their content and other personal information data for improved content sharing suggestion services. In yet another example, users can select to limit the length of time their personal information data is maintained by a third party, limit the length of time into the past from which content sharing suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information, such as the quality level of the content (e.g., focus, exposure levels, etc.) or the fact that certain content is being requested by a device associated with a contact of the user, other non-personal information available to the app store, or publicly available information.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" means A, B, C, or any combination thereof, such that one or more of a group of elements consisting of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure. For example, "an application" refers to "one application" or "a group of applications."

What is claimed is:

1. A method comprising:
   determining, for a first application, an application peer group based on a plurality of common traits among a set of app store applications, wherein the plurality of common traits are selected to cause a size of the application peer group to satisfy a privacy threshold;
   privatizing the application peer group to cause the application peer group to satisfy the privacy threshold, wherein the privatizing injects a margin of error into one or more peer group app store metrics;
   confirming that the privatized application peer group satisfies an accuracy threshold;
   obtaining the one or more peer group app store metrics for the privatized application peer group and one or more app store metrics for the first application; and
   causing a user interface element to be displayed to indicate a relative value of at least one of the one or more app store metrics for the first application among the one or more peer group app store metrics,
   wherein the user interface element identifies the application peer group without revealing a performance of individual apps within the application peer group.

2. The method of claim 1, wherein determining the application peer group comprises:
   determining a category set for the first application; and
   performing a match using the category set for the first application and a category set for each member of the application peer group.

3. The method of claim 2, wherein the category set for the first application comprises at least one selected from a group consisting of an application type, a monetization type, and a download volume.

4. The method of claim 1, further comprising:
   in accordance with a determination that the application peer group fails to satisfy the accuracy threshold:
      discarding at least one of the plurality of common traits to obtain a set of remaining common traits, and
      revising the application peer group based on the set of remaining common traits.

5. The method of claim 1, wherein privatizing the application peer group obfuscates individual peer group app store metrics among the application peer group.

6. The method of claim 1, wherein the one or more peer group app store metrics comprise at least one selected from a group consisting of a discoverability metric, a usage metric, and a monetization metric.

7. The method of claim 1, wherein the user interface element identifies the application peer group without revealing members of the application peer group.

8. A non-transitory computer readable medium comprising computer readable code executable by one or more processors to:
   determine, for a first application, an application peer group based on a plurality of common traits among a set of app store applications, wherein the plurality of common traits are selected to cause a size of the application peer group to satisfy a privacy threshold;
   privatizing the application peer group to cause the application peer group to satisfy the privacy threshold, wherein the privatizing injects a margin of error into one or more peer group app store metrics;
   confirming that the privatized application peer group satisfies an accuracy threshold;
   obtain the one or more peer group app store metrics for the application peer group and one or more app store metrics for the first application; and
   cause a user interface element to be displayed to indicate a relative value of at least one of the one or more app store metrics for the first application among the one or more peer group app store metrics,
   wherein the user interface element identifies the application peer group without revealing a performance of individual apps within the application peer group.

9. The non-transitory computer readable medium of claim 8, wherein the computer readable code to determine the application peer group comprises computer readable code to:
   determine a category set for the first application; and
   perform a match using the category set for the first application and a category set for each member of the application peer group.

10. The non-transitory computer readable medium of claim 9, wherein the category set for the first application comprises at least one selected from a group consisting of an application type, a monetization type, and a download volume.

11. The non-transitory computer readable medium of claim 8, further comprising computer readable code to:
    determine that the application peer group fails to satisfy a predetermined accuracy threshold and,
    in accordance with the determination that the application peer group fails to satisfy the accuracy threshold:
       discard at least one of the plurality of common traits to obtain a set of remaining common traits, and revise the application peer group based on the set of remaining common traits.

12. The non-transitory computer readable medium of claim 8, wherein privatizing the application peer group obfuscates individual peer group app store metrics among the application peer group.

13. The non-transitory computer readable medium of claim 8, wherein the one or more peer group app store metrics comprise at least one selected from a group consisting of a discoverability metric, a usage metric, and a monetization metric.

14. The non-transitory computer readable medium of claim 8, wherein the user interface element identifies the application peer group without revealing members of the application peer group.

15. A system comprising:
one or more processors; and
one or more non-transitory computer readable media comprising computer readable code executable by the one or more processors to:
determine, for a first application, an application peer group based on a plurality of common traits among a set of app store applications, wherein the plurality of common traits are selected to cause a size of the application peer group to satisfy a privacy threshold;
privatizing the application peer group to cause the application peer group to satisfy the privacy threshold, wherein the privatizing injects a margin of error into one or more peer group app store metrics;
confirming that the privatized application peer group satisfies an accuracy threshold; and
obtain the one or more peer group app store metrics for the application peer group and one or more app store metrics for the first application; and
cause a user interface element to be displayed to indicate a relative value of at least one of the one or more app store metrics for the first application among the one or more peer group app store metrics, wherein the user interface element identifies the application peer group without revealing a performance of individual apps within the application peer group.

16. The system of claim 15, wherein the computer readable code to determine the application peer group comprises computer readable code to:
determine a category set for the first application; and
perform a match using the category set for the first application and a category set for each member of the application peer group.

17. The system of claim 15, further comprising computer readable code to:
determine that the application peer group fails to satisfy a predetermined accuracy threshold and,
in accordance with the determination that the application peer group fails to satisfy the accuracy threshold:
discard at least one of the plurality of common traits to obtain a set of remaining common traits, and
revise the application peer group based on the set of remaining common traits.

18. The system of claim 15, wherein privatizing the application peer group obfuscates individual peer group app store metrics among the application peer group.

19. The system of claim 15, wherein the one or more peer group app store metrics comprise at least one selected from a group consisting of a discoverability metric, a usage metric, and a monetization metric.

20. The system of claim 15, wherein the user interface element identifies the application peer group without revealing members of the application peer group.

\* \* \* \* \*